(12) United States Patent
Davidovits et al.

(10) Patent No.: US 7,229,491 B2
(45) Date of Patent: Jun. 12, 2007

(54) POLY(SIALATE-DISILOXO)-BASED GEOPOLYMERIC CEMENT AND PRODUCTION METHOD THEREOF

(75) Inventors: Joseph Davidovits, Saint-Quentin (FR); Ralph Davidovits, Saint-Quentin (FR)

(73) Assignee: Red Lion Cement Technology Limited, Road Town, Tortola (VG)

( * ) Notice: Subject to any disclaimer, the term of this patent is extended or adjusted under 35 U.S.C. 154(b) by 378 days.

(21) Appl. No.: 10/515,820

(22) PCT Filed: May 22, 2003

(86) PCT No.: PCT/FR03/01545

§ 371 (c)(1),
(2), (4) Date: Nov. 26, 2004

(87) PCT Pub. No.: WO03/099738

PCT Pub. Date: Dec. 4, 2003

(65) Prior Publication Data

US 2005/0172860 A1     Aug. 11, 2005

(30) Foreign Application Priority Data

May 27, 2002  (FR) .................................. 02 06406

(51) Int. Cl.
*C04B 12/04*    (2006.01)
*C01B 33/26*    (2006.01)

(52) U.S. Cl. ...................... 106/602; 106/631; 106/636; 501/952; 423/328.1

(58) Field of Classification Search ................ 106/602, 106/631, 636; 501/95.2; 423/328.1
See application file for complete search history.

(56) References Cited

U.S. PATENT DOCUMENTS 5,342,595 A * 8/1994 Davidovits et al. ...... 423/328.1
5,798,307 A * 8/1998 Davidovits et al. ........ 501/95.2

* cited by examiner

*Primary Examiner*—Paul Marcantoni
(74) *Attorney, Agent, or Firm*—Browdy And Neimark, PLLC

(57) ABSTRACT

The invention relates to a geopolymeric cement or binder comprising an amorphous vitreous matrix consisting of a poly(sialate-disiloxo)-type geopolymeric compound, having approximation formula (Na, K, Ca)(—Si—O—Al—O—Si—O—Si—O) or (Na, K, Ca)-PSDS. The inventive cement consists of a mixture of different varieties of polysialates in which the atomic ratio Si:Al varies between 2 and 5.5, the average of the Si:Al atomic ratio values as measured with the electronic microprobe being close to between 2.8 and 3. The remaining components of the geopolymeric cement or binder, such as mellilite particles, aluminosilicate particles and quartz particles, are not used in said Si:Al atomic ratio calculation. The geopolymeric structure of type (K, Ca)-Poly(sialate-disiloxo) (K, Ca)-PSDS is between 50% and 60% more mechanically resistant than that of type (K, Ca)-Poly(sialate-siloxo) (K, Ca)—PSS of the prior art.

20 Claims, No Drawings

POLY(SIALATE-DISILOXO)-BASED GEOPOLYMERIC CEMENT AND PRODUCTION METHOD THEREOF

The present invention relates to a new type of geopolymeric cement intended for construction. This cement is called geopolymeric cement because it contains geopolymer minerals, consisting of alkaline aluminosilicates, best known under the name of poly(sialate), poly(sialate-siloxo) and/or poly(sialate-disiloxo). In the case of this invention, the geopolymeric cement is based on poly(sialate-disiloxo).

Former Techniques.

Two different types of cement may be distinguished: hydraulic cements and geopolymeric cements. Geopolymeric cements result from a mineral polycondensation reaction by alkaline activation, known as geosynthesis, in opposition to hydraulic traditional binders in which hardening is the result of a hydration of calcium aluminates and calcium silicates.

The poly(sialate) term was adopted to indicate the aluminosilicates geopolymers. The sialate network consists of $SiO_4$ and $AlO_4$ tetrahedrons alternatively bound by oxygen atoms. Cations (Na+, K+, Ca++, $H_3O+$) present in the structural cavities of the poly(sialate) balance the negative charge of $Al^{3+}$ in coordination (IV). The empirical formula of Polysialates is: $Mn\{-(SiO_2)z-AlO_2\}n, wH_2O$, with M representing the cation K, Na or Ca and "n" the degree of polymerization; "z" is equal to 1, 2, 3 or more, until 32. The three-dimensional network (3D) geopolymers are of type:

| | | |
|---|---|---|
| Poly(sialate) | M-PS | Si:Al = 1:1 |
| Mn—(—Si—O—Al—O—)n | | |
| Poly(sialate-siloxo) | M-PSS | Si:Al = 2:1 |
| Mn—(Si—O—Al—O—Si—O—)n | | |
| Poly(sialate-disiloxo) | M-PSDS | Si:Al = 3:1 |
| Mn—(Si—O—Al—O—Si—O—Si—O—)n | | |

The geopolymeric binders or cements of the types poly (sialate), poly(sialate-siloxo) and/or poly(sialate-disiloxo), were the subject of several patents highlighting their particular properties. One can quote for example the French patents: FR 2.489.290, 2.489.291, 2.528.818, 2.621.260, 2.659.319, 2.669.918, 2.758.323.

Geopolymeric cements of the prior art (WO 92/04298, WO 92/04299, WO 95/13995, WO 98/31644) are the result of a polycondensation between three distinct mineral reagents, i.e.:
a) aluminosilicate oxide ($Si_2O_5, Al_2O_2$)
b) potassium or sodium disilicate $(Na, K)_2(H_3SiO_4)_2$.
c) calcium disilicate $Ca(H_3SiO_4)_2$ With potassium disilicate, polycondensation is the result of the following chemical reaction:

$$2(Si_2O_5, Al_2O_2)+(Na, K)_2(H_3SiO_4)_2+Ca(H_3SiO_4)_2 \rightarrow (K_2O, CaO)(8SiO_2, 2Al_2O_3, nH_2O) \quad (1)$$

The obtained geopolymer is of the type (K, Ca)-Poly (sialate-siloxo), (K, Ca)-PSS with Si:Al=2. Then one adds various reactive mineral fillers like silica (silica fume), or natural aluminosilicates.

The reagents a) and b) are industrial reactive products added in the reactive medium. On the other hand, the ingredient c), calcium disilicate, occurs in a naissant state, in situ, in strong alkaline medium. It results in general from the chemical reaction between calcium silicate such as calcium mellilite present in blast furnace slag.

One of the interesting properties of geopolymeric cements is that during their manufacture they release very little of the greenhouse gas, carbon dioxide $CO_2$, whereas cements containing Portland cement clinker emit a great deal of carbon dioxide. As one can read in the publication entitled *Global Warming Impact on the Cement and Aggregates Industries,* published in *World Resource Review,* Vol. 6, NR 2, pp 263-278, 1994, one ton of Portland cement releases 1 ton of gas $CO_2$, whereas geopolymeric cement releases 5 to 10 times less. In other words, within the framework of the international laws and protocols limiting future $CO_2$ emissions, a cement manufacturer initially producing Portland cement will be able to produce 5 to 10 times more geopolymeric cement, while emitting the same quantity of $CO_2$. The appeal of geopolymeric cements is very obvious for the economies of the developing countries.

Thus, the French patent FR 2.666.253 describes a process for obtaining geopolymeric cement, without carbon dioxide $CO_2$ emission, in which the matrix, after hardening, is a geopolymer of the type (Ca, Na, K)-poly(sialate-siloxo), (Ca, Na, K)-PSS, in which the atomic ratio Si:Al is equal to 2. In the present invention, the matrix is of the type (Ca, Na, K)-poly(sialate-disiloxo), (Ca, Na, K)-PSDS and the atomic ratio Si:Al in the vitreous matrix is close to 3, this being characteristic of a geopolymer different from that of the prior art.

However, one finds in the prior art a manufacturing process for a geopolymer of the type (Na, K)-poly(sialate-disiloxo), (Na, K)-PSDS. As it is described in the European patent EP 0 518 980, one exclusively uses an alkaline solution of a very special silica obtained in an electric furnace, and the reactive mixture contains sodium Na, or potassium, K, alkaline silicates, but does not include any calcium Ca. In the present invention one does not use this artificial thermal silica, but only aluminosilicate materials of geological origin, more precisely residual rocks with strongly advanced kaolinization.

In another patent of the prior art, publication WO 92/04299 of the PCT/CH91/00187, was mentioned a cement that contains tecto-alumino-silicates resulting from the reaction between metakaolin, reactive silica, aluminosilicate chemically activated at a temperature between 800° C. and 1200° C., soluble alkali silicate, alkali hydroxide (KOH or NaOH), and calcium silicate. One obtains an aluminosilicate cement whose general formula gives an atomic ratio Al:Si in the range of 4:6 to 4:14, that is to say a Si:Al ratio varying from 1.5 to 3.5. However, it is specified that it is a general formula, including the sum of all the components, namely the soluble compounds that make the matrix, to which are added the insoluble elements still in the form of grains and particles. In fact, in this cement of the prior art, the active matrix (called here in the present invention vitreous matrix) is of the type (Ca, Na, K)-poly(sialate-siloxo), (Ca, Na, K)-PSS, like other geopolymeric cements of the prior art. The proof is provided by FIG. 7 of the publication WO 92/04299, which reproduces the Nuclear Magnetic resonance spectrum of 29Si. This 29Si spectrum consists of two resonances, one at −94.5 ppm, the other at −113.9 ppm, and is similar to that of geopolymeric cement described on pages 113 to 117 of the scientific publication titled: *Geopolymers: Man-Made Rock Geosynthesis and the resulting development of very early high strength cement,* published in *Journal of Material Education,* Vol. 16, pp. 91-137, 1994 (see also on pages 136-138 of the publication entitled: *Properties of Geopolymer Cements,* published in Proceedings of the International First Conference on Alkaline Cements and Concretes, Kiev, 1994). The first resonance at −94.5 ppm corresponds to a $SiQ_4(2Al)$ site, i.e. precisely the structure for poly(sialate-siloxo) PSS, with Si:Al=2. The second resonance at −113.9, is that of $SiO_2$, $SiQ_4(0Al)$, i.e. either of insoluble quartz or silica particle. It is therefore proven that the general chemical formula disclosed in publication WO 92/04299, in which the Si:Al ratio varies from 1.5 to 3.5, is the result of the addition of all the elements, in particular of insoluble silica. It is not the chemical formula of the vitreous matrix, which has a Si:Al ratio close to 2. On the contrary, in the present invention, the chemical formula of the vitreous matrix does not take into account the particles and grains which are embedded in it. In the matrix of this invention, the aforementioned geopolymer compound of the Poly(sialate-disiloxo) type consists of a mixture of different varieties of polysialates in which the atomic ratio Si:Al varies between 2 and 5.5, the average of the values of the atomic ratio Si:Al being close to 2.8 to 3. The other components of the aforesaid binding or geopolymeric cement, such as the particles of mellilite, the aluminosilicate particles, the quartz particles, or the silica particles, do not enter into the calculation of this atomic ratio Si:Al.

Another example of geopolymeric cement of the prior art is described in the publication WO 98/31644 for PCT/FR98/00059. In this description, the geopolymeric vitreous matrix is characterized by its 29Si MAS-NMR spectrum. Thus, one can read on page 9, lines 1-7 that the spectrum has a resonance ranging between −85 and −89 ppm characteristic of a mixture consisting of $(SiO_4)$ sites of the type $SiQ_4(3Al, 1Si)$ associated with a hydroxylated aluminosilicate $(SiO_4)$ of the type $Q_3(2Si, 1Al, 1OH)$. One obtains a geopolymeric compound made of a poly(sialate), Si:Al=1 mixed with a poly(sialate-siloxo), Si:Al=2, the aforementioned compound having a Si═Al ratio close to 1.6. Such a matrix is described hereafter in Example 1.

All geopolymeric cements of the prior art are characterized by the extremely fine grain size of the principal solid components. The average grain size is about 8 microns (WO 98/31644, page 9 line 36 and page 10 line 17), even as low as 3.5 microns (WO 92/04299, page 16 Beispiel 4). Indeed, in the prior art, the objective was to produce a cement with ultra-fast setting, and for this reason it was necessary to ensure a maximum solubilization of the solid reagents; this explains the need for the finest possible grain size. Thus, one can read in the publication WO 92/04298, page 10, lines 10-16 and 38-40, that the basic silicates are after 30 minutes transformed into soluble naissant calcium disilicate. On the other hand, in the present invention, the average diameter is in the range between 15 microns and 25 microns, thus preventing any dissolution of the mellilite and natural silico-aluminates particles in the aforementioned amorphous vitreous matrix. In the present invention, the hardening mechanism is different from the one in the prior art, because there is no formation of calcium disilicate, but primarily cation exchanges between the alkali cations (Na, K)+ and the Calcium Ca++ cation.

BRIEF DESCRIPTION OF THE INVENTION

The principal object of the invention is the description of a geopolymeric binder or cement consisting of an amorphous vitreous matrix embedding mellilite particles, aluminosilicate particles and quartz particles, said particles having an average diameter lower than 50 microns. In the binder or cement of the present invention the aforementioned amorphous vitreous matrix comprises a geopolymer compound of the Poly(sialate-disiloxo) type, with the approximate formula (Na, K, Ca)(—Si—O—Al—O—Si—O—Si—O), or (Na, K, Ca)-PSDS. The said geopolymer compound of the Poly(sialate-disiloxo) type consists of a mixture of different varieties of polysialates in which the atomic ratio Si:Al varies between 2 and 5.5, the average of the values of the atomic ratio Si:Al being close to 2.8 to 3. The other components of the said geopolymeric binder or cement, such as the mellilite particles, the aluminosilicate particles and the quartz particles, do not enter into the calculation of this atomic ratio Si:Al.

This new geopolymeric binder or cement is obtained by hardening a reactive mixture comprising:

a) a residual rock from a strongly weathered granitic type in which the kaolinization is far advanced;

b) calcium mellilite glass in which the glass part is higher than 70% by weight;

c) a soluble alkaline silicate in which the molar ratio $(Na, K)_2O:SiO_2$ ranges between 0.5 and 0.8;

The aforementioned residual rock of weathered granitic type consists of 20 to 80 percent by weight of kaolinite and 80 to 20 percent by weight of feldspathic and quartzitic residual sands. In order to increase the geopolymeric properties of the binders or cements described in this invention, it is preferable that the aforementioned residual rock is calcined at a temperature ranging between 650° C. and 950° C. This allows the use of a mining waste produced during the extraction of coal, in place of the residual rock of weathered granitic type, In the preparation of the binders and cements according to the present invention, the average diameter of the grain size distribution for the calcium mellilite glass lies between 15 microns and 25 microns, thus preventing the dissolution of these particles of mellilite in the aforementioned amorphous vitreous matrix.

DESCRIPTION OF THE PREFERRED EMBODIMENTS

The scientific analysis of the geopolymeric binders or cements is performed with the electron microscope microbeam analysis. With this technique it is possible to determine unambiguously the chemical composition of the three principal components comprising the cements of this invention, namely:

the amorphous vitreous matrix;

the particles of the calcium mellilite glass;

the aluminosilicates rock particles (feldspars, plagioclase, feldspathoïd, zeolite, pyroxene, amphibole) and quartz.

The binders or cements of this invention are illustrated in the following examples. They have no limiting character on the scope of the invention as presented in the claims. All indicated parts are by weight.

EXAMPLE 1

In order to understand better the difference between the vitreous matrix of this invention and those of the prior art, this example replicates the cement known as "base" and described in the publication WO 98/31644, page 9, lines 30-39, i.e.:

| | |
|---|---:|
| calcined kaolinitic clay aluminosilicate oxide ($Si_2O_5$, $Al_2O_2$) | 30 parts |

-continued

| K silicate solution, (by weight) $K_2O$: 26%, $SiO_2$: 21%, $H_2O$: 53% | 25 parts |
| blast furnace slag (calcium mellilite) average grain size 8 microns | 27 parts |
| water | 31 parts |

The objective of the prior art being to manufacture the calcium disilicate $Ca(H_3SiO_4)_2$, in situ, the electron microscopy of the cement thus obtained must show the disappearance of the calcium mellilite particles, as can be read in this same publication on page 7, lines 13-20, namely: "... When, under the microscope, [S.E.M.], one looks at the cements obtained with the mixtures described in the examples 1 to 10, one notes that, in the case of blast furnace slag, the majority of the slag grains have disappeared. One only sees an imprint of their initial shape, in the shape of an envelope, probably made up of akermanite, which did not react This process is very regular and can be complete within 30 minutes, at ambient temperature.)

The chemical composition for this cement is given as oxides in Table I. The values for water were omitted voluntarily.

TABLE I

|  | $SiO_2$ | $Al_2O_3$ | $Fe_2O_3$ | MgO | CaO | $Na_2O$ | $K_2O$ |
|---|---|---|---|---|---|---|---|
| ($Si_2O_5$, $Al_2O_2$) | 16.33 | 12.76 | 0.15 | 0.096 | 0.012 | 0.042 | 0.439 |
| Ca mellilite | 9.58 | 3.24 | 0.054 | 2.43 | 11.34 | 0.054 | 0.135 |
| K-silicate. | 5.23 | 0 | 0 | 0 | 0 | 0 | 6.495 |
| total oxides by weight | 31.15 | 16.00 | 0.210 | 2.52 | 11.35 | 0.096 | 7.069 |
| total in mole | 0.519 | 0.157 |  | 0.063 | 0.20 | 0.0015 | 0.0752 |

The oxide mole values provide the atomic ratios:

| Si:Al | 1.65 |  |  |
| K:Al | 0.48 | Si:K | 3.43 |
| Ca:Al | 0.65 | Si:Ca | 2.53 |

After hardening, the electronic micro beam analysis provides the oxide chemical composition for the vitreous matrix in which the calcium mellilite grains have practically all disappeared. Only some coarse grains remain with a size higher than 20 microns. One makes 14 micro beam measurements on the vitreous matrix. The average value of these measurements provides the following atomic ratios (between brackets, the lowest and the highest values):

| Si:Al | 1.655 (1.317 to 1.832) |  |  |
| K:Al | 0.442 (0.192 to 0.614) | Si:K | 3.73 |
| Ca:Al | 0.679 (0.388 to 0.870) | Si:Ca | 2.43 |

Calcium mellilite effectively dissolved, resulting in the formation, in situ, of calcium disilicate Ca(H3SiO4)2. The obtained geopolymeric compound is thus made up of a simple mixture of poly(sialate) (K, Ca)—PS, Si:Al=1, and of poly(sialate-siloxo), (K, Ca)-PSS, Si:Al=2, the aforementioned compound having a Si=Al ratio close to 1.6, according to the chemical reaction (1) described above.

EXAMPLE 2

One prepares a first mixture (A) made of aluminosilicate powders comprising:

A) Mixture

| aluminosilicate oxide ($Si_2O_5$, $Al_2O_2$) | 30 parts |
| feldspathic rock ground at 15–25 microns | 50 parts |
| calcium mellilite ground at 15–25 microns | 30 parts |

To these 110 parts of (A) mixture are added the reactive mixture (B) containing:

B) Mixture

| the K silicate solution, (by weight) $K_2O$: 26%, $SiO_2$: 21%, $H_2O$: 53% | 30 parts |
| water | 15 parts |

As it is noted, the average grain size of the feldspathic rock and of the calcium mellilite is higher, ranging between 15-25 microns, which is quite different from the prior art. In addition to the patents already referred to above, which all recommend average grain sizes lower than 10 microns, one can also quote the Forss patents, which first recommended the use of alkaline activation for blast furnace slag, such as for example the U.S. Pat. No. 4,306,912. In the Forss patents, the average grain size is expressed by its specific surface that is higher than 400 m2/kg, preferably ranging between 500 and 800 m2/kg, i.e. below 10 microns.

One lets this mixture harden at ambient temperature. The compressive strength at 28 days is 70 MPa. Then, one looks at the compound with the electron microscope. The obtained geopolymeric cement consists of three distinct elements:
a) a vitreous matrix
b) calcium mellilite particles
c) feldspathic rock particles The micro-beam analysis provides the chemical composition of these three elements. The average value of these measurements provides the following atomic ratios (between brackets, the lowest and the highest values):

a) vitreous matrix

| Si:Al | 2.854 (2.047 to 5.57) |  |  |
| K:Al | 0.556 (0.306 to 0.756) | Si:K | 6.13 (3.096 to 9.681) |
| Ca:Al | 0.286 (0.107 to 0.401) | Si:Ca | 15.02 (4.882 to 41.267) | b) calcium mellilite particles

Table II gives the chemical composition of calcium mellilite, and the average of the 15 measurements provided by the electronic micro beam (values expressed by weight).

TABLE II

|  | Ca Mellilite | Average micro beam |
|---|---|---|
| $K_2O$ | 0.5 | 1.55 |
| $SiO_2$ | 35.5 | 35.38 |
| CaO | 42 | 37.57 |
| $Na_2O$ | 0.2 | 0.22 |

TABLE II-continued

|  | Ca Mellilite | Average micro beam |
|---|---|---|
| $Al_2O_3$ | 12 | 11.93 |
| MgO | 9 | 8.59 | c) feldspathic rock particles

Table III gives the chemical composition of the feldspathic rock and the average of the 15 measurements provided by the electronic micro beam for the alkaline feldspar particles (values expressed by weight).

TABLE III

|  | feldspathic rock | Average micro beam feldspar |
|---|---|---|
| $K_2O$ | 4.89 | 7.55 |
| $SiO_2$ | 74.16 | 66.05 |
| CaO | 0.43 | 0.38 |
| $Na_2O$ | 4.33 | 6.20 |
| $Al_2O_3$ | 13.80 | 19.25 |
| MgO | 0.17 | 0.02 |

It is first noted that, in the vitreous matrix, the Si:Al ratio is much higher than that of Example 1) since the average value increases from 1.65 to 2.85. There is thus an additional value for silica which can only come from the siliceous part of the feldspathic rock, by which the content of $SiO_2$ decreases from 74,16 to 66,05 (see Table III). However, according to Table II, there is no difference between the chemical analysis of the Ca mellilite carried out before the mixture and the average value of the 15 micro beam measurements; $SiO_2$ quantity remains equal to approximately 35.5. In other words, the silica found in the vitreous matrix of this Example 2) does not come from the calcium mellilite, but exclusively from the feldspathic rock. Contrary to the cements of the prior art, there is no production of calcium disilicate $Ca(H_3SiO_4)_2$ One then notes in Table II, that the quantity of $K_2O$ in the calcium mellilite particles is multiplied by 3, passing from 0.5 to 1.55, with values being able to reach 4.11, even 8.2 for certain particles. On the other hand, the quantity of CaO changed from 42 to 37.5. One now understands why in the vitreous matrix of this Example 2), the quantity of potassium K is weaker than in the matrix of the Example 1). Part of the potassium present in the reactive medium happened to be fixed in the particles of Ca mellilite, to replace the Calcium atoms which are now included in the geopolymeric vitreous matrix. For calcium mellilite, the hardening at ambient temperature shows a reduction of 10 to 20% by weight of its content in CaO, simultaneously accompanied by an increase of 100 to 500% (on average 300%) by weight of its content in K2O, the content of the other components like $SiO_2$, $Al_2O_3$ and MgO, being unchanged. This exchange is a complete surprise, because nothing in the prior art could forecast this mechanism. It is supposed that it is primarily due to the fact that the grain size of Ca mellilite being higher than in the prior art, the dissolution rate of silica pertaining to the feldspathic rock is much faster than that of the dissolution of the calcium disilicate. Only a small quantity of calcium has time to leave the mellilite particle, being immediately replaced by a certain quantity of potassium.

Another surprise comes from the fact that this mechanism ends with the formation of a geopolymeric cement having mechanical strengths significantly higher than those of the prior art. Thus, in publication WO 98/31644,28 day compressive strengths are ranging between 30 and 60 MPa, whereas in this Example 2) they are ranging between 80 and 100 MPa. The geopolymeric structure of type (K, Ca)-Poly (sialate-disiloxo) (K, Ca)-PSDS is thus 50% to 60% more resistant mechanically than that of type (K, Ca)-Poly(sialate-siloxo) (K, Ca)-PSS of the prior art.

EXAMPLE 3

One takes the same reactive mixture of Example 2), but in the (A) mixture one adds 45 parts of calcium mellilite with an average grain size of 15-25 microns, instead of 30 parts. The other conditions are unchanged. The 28 day compressive strength of the geopolymeric cement is 120-130 MPa.

Instead of making a mixture of oxide aluminosilicate and feldspathic rock as in Example 2), one uses naturally occurring geological products containing these two elements. Indeed, the prior art teaches us that the aluminosilicate oxide $(Si_2O_5, Al_2O_2)$ is obtained by calcining kaolinite between 650° C. and 950° C. This material, kaolinite, is the result of the weathering of feldspars and it is naturally found in weathered granitic residual rocks. The weathered granitic residual rock consists of 20 to 80 percent by weight of kaolinite and 80 to 20 percent by weight of feldspathic and quartzitic residual sand containing reactive silica.

In order to have a maximum reactivity, the weathered granitic residual rock in which kaolinization is very advanced, is calcined at a temperature ranging between 650° C. and 950° C. and, on the one hand ground at an average grain size of 15-25 microns for the feldspathic and quartzitic parts, the kaolinitic part, and on the other hand, having naturally a quite lower particle size.

EXAMPLE 4

One takes again the reactive mixture of Example 3) but instead of carrying out a mixture of aluminosilicate oxide and feldspathic rock, one adds 100 parts of a residual granite initially containing 35% of kaolin by weight. This granite was calcined at 750° C. for 3 hours, then ground to an average grain size of 15-25 microns for the feldspathic and quartzitic parts. The other conditions are unchanged. The compressive strength at 28 days for the geopolymeric cement is 125 MPa.

EXAMPLE 5

One chooses as residual rock, pertaining to the strongly weathered granitic type in which kaolinization is very advanced, the waste of coal mining. Throughout the world, coal veins are very often imprisoned between geological layers of kaolinitic granite. Sometimes, when coal was naturally ignited, heat was sufficient to transform kaolinite into aluminosilicate oxide $(Si_2O_5, Al_2O_2)$. Such a natural layer exists in Australia, but is not exploited. On the other hand one can advantageously calcine kaolinitic coal-mining rock waste. The chemical analysis of a rock of this type is as follows:

| coal | 3.07 |
|---|---|
| $SiO_2$ | 63.71 |
| $Al_2O_3$ | 13.44 |
| $Fe_2O_3$ + FeO | 4.72 |
| MgO | 2.31 |
| CaO | 2.72 |

-continued

| | |
|---|---|
| $Na_2O$ | 1.88 |
| $K_2O$ | 2.40 |
| $H_2O+$ | 3.20 |
| $H_2O-$ | 1.34 |

It contains approximately 25% plagioclase (feldspar), 30% quartz, 10% amphibole, 27% kaolinite, 3% coal and 6% of other elements.

One calcines it at 750° C. for 3 hours, then one grinds it to an average grain size of 15-25 microns.

Then, one prepares the following reactive mixture:

| | |
|---|---|
| a) kaolinitic coal-mining waste, | 90 parts |
| b) calcium mellilite ground to 15–25 microns | 30 parts |
| c) K silicate solution, (by weight) $K_2O$: 26%, $SiO_2$: 21%, $H_2O$: 53% | 30 parts |
| water | 20 parts |

One hardens at ambient temperature. The compressive strength at 7 days is 40 MPa, and at 28 days is 105 MPa. The pH of the geopolymeric cement measured at equilibrium in a 10% solution is pH=12.14 after 7 days and pH=1 1.85 after 28 days.

It is interesting to compare the energy needs as well as the greenhouse gas $CO_2$ emissions of traditional Portland cements vis a vis geopolymeric cement according to the present invention:

| type | calcination | crushing | total |
|---|---|---|---|
| Energy needs, MJ/tonne | | | |
| Portland cement | 3200 | 430 | 3430 |
| geopolymeric | 600 | 390 | 990 |
| Greenhouse gas Emission, $CO_2$ in tonne/tonne | | | |
| Portland cement | 1.00 | | |
| geopolymeric cement | 0.15–0.20 | | |

The manufacture of geopolymeric cement by which the amorphous vitreous matrix consists of a geopolymer compound of the Poly(sialate-disiloxo) type, with the approximate formula (Na, K, Ca)(—Si—O—Al—O—Si—O—Si—O), or (Na, K, Ca)-PSDS, requires 3.5 times less energy than that of Portland cement; in addition, it emits 5 to 6 times less of the greenhouse gas $CO_2$. The industrial interest of the cements made according to the present invention is thus obvious.

Of course, various modifications can be made by the workers in the field to the geopolymeric binders or cements and the methods which have been just described simply as an example, whilst staying within the terms of the invention.

The invention claimed is:

1. A geopolymeric binder or cement comprising an amorphous vitreous matrix embedding mellilite particles, aluminosilicate particles and quartz particles, said particles having an average diameter lower than 50 microns, wherein said amorphous vitreous matrix comprises a Poly(sialate-di siloxo) geopolymer compound, with the approximate formula (Na, K, Ca)(—Si—O—Al—O—Si—O—Si—O), or (Na, K, Ca)-PSDS.

2. The geopolymeric binder or cement according to claim 1, wherein said geopolymer compound comprises a mixture of various varieties of polysialates in which the atomic ratio Si:Al varies between 2 and 5.5, the average of the values of the atomic ratio Si:Al being about 2.8 to 3 other components of the said geopolymeric binder or cement, including mellilite particles, the aluminosilicate particles and the quartz particles, not entering into the calculation of this atomic ratio Si:Al.

3. The geopolymeric binder or cement according to claim 1, wherein in said amorphous vitreous matrix, the average of the values of the atomic ratio Si:(Na, K) as measured with the electronic micro beam analysis is about 6, varying from 3.096 to 9.681.

4. The geopolymeric binder or cement according to claim 1, wherein in the said amorphous vitreous matrix, the average of the values of the atomic ratio Si:Ca as measured with the electronic micro beam analysis is about 15 varying from 4.882 to 41.267.

5. The geopolymeric binder or cement according to claim 1, wherein the average grain size distribution of calcium mellilite glass, ranges between 15 microns and 25 microns, thus preventing the dissolution of these mellilite particles in the said amorphous vitreous matrix.

6. The geopolymeric binder or cement according to claim 1, wherein, during hardening at ambient temperature, calcium mellilite shows a reduction of 10 to 20% by weight of its content in CaO, accompanied simultaneously by an increase of 100 to 500% by weight of its content in $K_2O$, the content of the other components like $SiO_2$, $Al_2O_3$ and MgO, being unchanged.

7. The geopolymeric binder or cement according to claim 1, wherein said aluminosilicate particles and said quartz particles are found in a weathered granitic rock.

8. The geopolymeric binder or cement according to claim 7), wherein said weathered granitic rock is a mining waste resulting from the extraction of coal.

9. The geopolymeric cement according to claim 1, that during its manufacture produces substantially no greenhouse gas, carbon dioxide, $CO_2$.

10. The geopolymeric binder or cement according to claim 2, wherein in said amorphous vitreous matrix, the average of the values of the atomic ratio Si(Na, K) as measured with the electronic micro beam analysis is about 6, varying from 3.096 to 9.681.

11. The geopolymeric binder or cement according to claim 2, wherein in the said amorphous vitreous matrix, the average of the values of the atomic ratio Si:Ca as measured with the electronic micro beam analysis is about 15 varying from 4.882 to 41.267.

12. The geopolymeric binder or cement according to claim 2, wherein the average grain size distribution of calcium mellilite glass, ranges between 15 microns and 25 microns, thus preventing the dissolution of these mellilite particles in the said amorphous vitreous matrix.

13. The geopolymeric binder or cement according to claim 2, wherein, during hardening at ambient temperature, calcium mellilite shows a reduction of 10 to 20% by weight of its content in CaO, accompanied simultaneously by an increase of 100 to 500% by weight of its content in $K_2O$, the content of the other components including $SiO_2$, $Al_2O_3$ and MgO, being unchanged.

14. The geopolymeric binder or cement according to claim 2, wherein said aluminosilicate particles and said quartz particles are found in a weathered granitic rock.

15. The geopolymeric binder or cement according to claim 2, wherein said weathered granitic rock is a mining waste resulting from the extraction of coal.

16. The geopolymeric binder or cement according to claim 3, wherein in the said amorphous vitreous matrix, the average of the values of the atomic ratio Si:Ca as measured with the electronic micro beam analysis is about 15 varying from 4.882 to 41.267.

17. The geopolymeric binder or cement according to claim 16, wherein the average grain size distribution of calcium mellilite glass, ranges between 15 microns and 25 microns, thus preventing the dissolution of these mellilite particles in the said amorphous vitreous matrix.

18. The geopolymeric binder or cement according to claim 17, wherein, during hardening at ambient temperature, calcium mellilite shows a reduction of 10 to 20% by weight of its content in CaO, accompanied simultaneously by an increase of 100 to 500% by weight of its content in $K_2O$, the content of the other components including $SiO_2$, $Al_2O_3$ and MgO, being unchanged.

19. The geopolymeric binder or cement according to claim 18, wherein said aluminosilicate particles and said quartz particles are found in a weathered granitic rock.

20. The geopolymeric binder or cement according to claim 19, wherein said weathered granitic rock is a mining waste resulting from the extraction of coal.

* * * * *